(12) United States Patent
Niwata

(10) Patent No.: US 9,121,459 B2
(45) Date of Patent: Sep. 1, 2015

(54) DRIVING FORCE TRANSMITTING APPARATUS

(71) Applicant: HONDA MOTOR CO., LTD., Tokyo (JP)

(72) Inventor: Kenji Niwata, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 42 days.

(21) Appl. No.: 14/207,653

(22) Filed: Mar. 13, 2014

(65) Prior Publication Data

US 2014/0262676 A1 Sep. 18, 2014

(30) Foreign Application Priority Data

Mar. 14, 2013 (JP) .................................. 2013-051498

(51) Int. Cl.
*F16D 25/0638* (2006.01)
*F16D 25/12* (2006.01)
*F16H 48/19* (2012.01)

(52) U.S. Cl.
CPC ............ *F16D 25/0638* (2013.01); *F16D 25/12* (2013.01); *F16H 48/19* (2013.01); *F16D 2300/18* (2013.01)

(58) Field of Classification Search
CPC ..... F16D 25/06; F16D 25/0638; F16D 25/12; F16D 2300/18
USPC .................................. 192/85.24, 85.27, 85.53
See application file for complete search history.

(56) References Cited

U.S. PATENT DOCUMENTS

| 4,646,893 | A  | * | 3/1987  | Romi .......................... 192/85.53 |
| 5,197,583 | A  | * | 3/1993  | Sakai et al. ...................... 192/35 |
| 6,315,097 | B1 | * | 11/2001 | Burns .............................. 192/35 |
| 6,681,912 | B2 | * | 1/2004  | Suzuki et al. ............... 192/85.41 |

FOREIGN PATENT DOCUMENTS

| JP | 06-49829 U  | 7/1994  |
| JP | 2010-38174  | 2/2010  |
| JP | 2011-64302  | 3/2011  |
| JP | 2012-218669 | 11/2012 |

OTHER PUBLICATIONS

Japanese Office Action for corresponding JP Application No. 2013-051498, Oct. 7, 2014.

* cited by examiner

*Primary Examiner* — Huan Le
(74) *Attorney, Agent, or Firm* — Mori & Ward, LLP

(57) ABSTRACT

A driving force transmitting apparatus includes a rotating shaft, a frictional engagement device, a piston member, a piston housing, a piston chamber, an oil pressure sensor, an attachment hole, an operating-oil receiving chamber, a bubble removing chamber, and a bubble discharging groove. The rotating shaft has an axial direction and is rotatable around the axial direction. The frictional engagement device includes a frictional engagement unit which is disposed around the rotating shaft and which includes first and second friction members that are alternately stacked in the axial direction. The piston member is movable in the axial direction to press the frictional engagement unit so that the first and second friction members are engaged with each other. The piston housing contains the piston member. The piston chamber is defined between an inner surface of the piston housing and the piston member.

6 Claims, 7 Drawing Sheets

F: FLOW OF OPERATING OIL

F: FLOW OF OPERATING OIL

DRIVING FORCE TRANSMITTING APPARATUS

CROSS-REFERENCE TO RELATED APPLICATIONS

The present application claims priority under 35 U.S.C. §119 to Japanese Patent Application No. 2013-051498, filed Mar. 14, 2013, entitled "Lubrication Structure For Driving Force Transmitting Apparatus." The contents of this application are incorporated herein by reference in their entirety.

BACKGROUND

1. Field

The present disclosure relates to a driving force transmitting apparatus.

2. Description of the Related Art

An example of a driving force transmitting apparatus for an automobile includes a frictional engagement device, such as a clutch or a brake, provided around a rotating shaft (see, for example, Japanese Unexamined Patent Application Publication No. 2012-218669 (hereinafter referred to as Patent Document 1)). The driving force transmitting apparatus described in Patent Document 1 includes a clutch capable of switching between a state in which rotation is transmitted between two coaxially arranged rotating shafts and a state in which no rotation is transmitted between the two rotating shafts. The clutch includes a clutch housing fixed to one of the rotating shafts, a clutch hub fixed to the other rotating shaft in a region inside the clutch housing, and a frictional engagement unit. The frictional engagement unit includes a plurality of friction members fixed to the clutch housing and a plurality of friction members fixed to the clutch hub. The friction members fixed to the clutch housing and the friction members fixed to the clutch hub are alternately stacked in an axial direction in the clutch housing.

The clutch includes a piston member for pressing the frictional engagement unit in the direction in which the friction members are stacked, a piston housing that contains the piston member, and a piston chamber that is defined between the piston housing and the piston member and in which an oil pressure for moving the piston member toward the frictional engagement unit is generated. The clutch is engaged when the piston member is moved by the oil pressure generated in the piston chamber and the frictional engagement unit is pressed by the piston member.

The driving force transmitting apparatus including the above-described clutch includes an oil pressure sensor for detecting a clutch pressure (oil pressure in the piston chamber). The torque transmitted by the clutch is controlled in accordance with a clutch pressure detected by the oil pressure sensor.

SUMMARY

According to one aspect of the present invention, a driving force transmitting apparatus includes a rotating shaft, a frictional engagement device, a piston member, a piston housing, a piston chamber, an oil pressure sensor, an attachment hole, an operating-oil receiving chamber, a bubble removing chamber, and a bubble discharging groove. The rotating shaft has an axial direction and is rotatable around the axial direction. The frictional engagement device includes a frictional engagement unit which is disposed around the rotating shaft and which includes first and second friction members that are alternately stacked in the axial direction. The piston member is movable in the axial direction to press the frictional engagement unit so that the first and second friction members are engaged with each other. The piston housing contains the piston member. The piston chamber is defined between an inner surface of the piston housing and the piston member. An oil pressure to move the piston member toward the frictional engagement unit is generated in the piston chamber. The oil pressure sensor is configured to detect the oil pressure of operating oil in the piston chamber. The attachment hole opens in a back surface of the piston hosing. The oil pressure sensor is attached to the attachment hole such that a sensor axial direction of the oil pressure sensor extends along the back surface of the piston housing. The operating-oil receiving chamber is provided in the piston housing. A detection portion of the oil pressure sensor is disposed in the operating-oil receiving chamber. The bubble removing chamber is to remove bubbles accumulated in the operating-oil receiving chamber. The bubble removing chamber is provided in the piston housing at a position adjacent to the operating-oil receiving chamber. The bubble discharging groove is connected to the bubble removing chamber. The bubbles are discharged via the bubble discharging groove.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 6A is a sectional view of the driving force transmitting apparatus including the oil pressure sensor provided on the left clutch, and FIG. 6B is a sectional view of the driving force transmitting apparatus including the oil pressure sensor provided on the right clutch.

DESCRIPTION OF THE EMBODIMENTS

Figure 1:
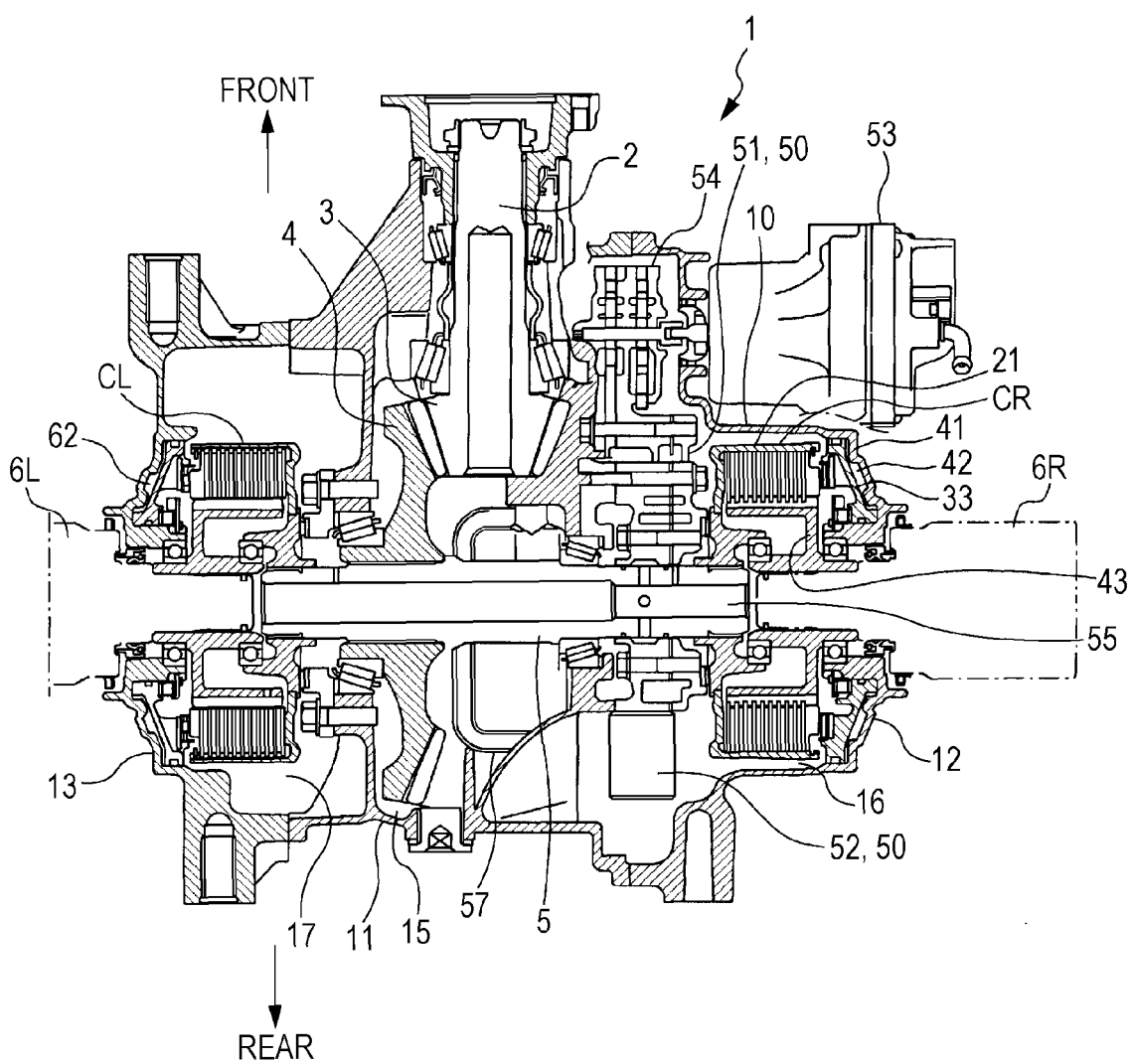
FIG. 1 is a sectional view of a driving force transmitting apparatus according to an embodiment of the present disclosure.

The embodiments will now be described with reference to the accompanying drawings, wherein like reference numerals designate corresponding or identical elements throughout the various drawings.

An embodiment of the present disclosure will now be described in detail with reference to the accompanying drawings. FIG. 1 is a sectional view of a driving force transmitting apparatus 1 according to the embodiment of the present disclosure. As illustrated in FIG. 1, the driving force transmitting apparatus 1 includes a hypoid pinion shaft 2 connected to a propeller shaft (not shown) that is rotated by a driving force transmitted from an engine (not shown); a hypoid pinion gear 3 formed at an end of the hypoid pinion shaft 2; and a hypoid ring gear 4 that meshes with the hypoid pinion gear 3.

The hypoid ring gear 4 is attached to the outer periphery of a rotation input shaft 5, which is hollow and arranged coaxially with a left axle 6L and a right axle 6R. Therefore, when the hypoid pinion shaft 2 is rotated by the engine and the propeller shaft, the driving force is transmitted to the rotation input shaft 5 through the hypoid pinion gear 3 and the hypoid ring gear 4, and the rotation input shaft 5 is rotated.

A left clutch CL, which transmits the driving force between the rotation input shaft 5 and the left axle 6L, is provided on an end portion of the rotation input shaft 5 at the end at which the hypoid ring gear 4 is attached. A right clutch CR, which transmits the driving force between the rotation input shaft 5 and the right axle 6R, is provided on an end portion of the rotation input shaft 5 at the other end. The rotation of the rotation input shaft 5 is transmitted to the left clutch CL and the right clutch CR. A casing 10 of the driving force transmitting apparatus 1 includes a main casing 11 disposed in a central region of the rotation input shaft 5 in an axial direction thereof (width direction of the vehicle), a right casing 12 attached to the right side of the main casing 11, and a left casing 13 attached to the left side of the main casing 11. The main casing 11 contains a gear chamber 15 that is arranged in a central region of the rotation input shaft 5 in the axial direction thereof. A pair of clutch chambers 16 and 17, which are arranged on both sides of the gear chamber 15, are disposed in the left and right casings 12 and 13, respectively. Thus, the casing 10 of the driving force transmitting apparatus 1 has a three-chamber structure including the gear chamber 15 and the pair of clutch chambers 16 and 17.

The hypoid pinion gear 3 and the hypoid ring gear 4 are disposed in the gear chamber 15, and the left clutch CL and the right clutch CR are disposed in the clutch chambers 16 and 17, respectively. An operating-oil supply unit 50, which includes a valve body 51 and a linear solenoid valve 52 for supplying operating oil to, for example, the left clutch CL and the right clutch CR, is also disposed in the right clutch chamber 16. The operating oil is supplied to the valve body 51 from an oil pump (electric oil pump) 54 driven by a motor 53. An operating-oil passage 55 is provided to guide the operating oil from the valve body 51 and the linear solenoid valve 52 to the right clutch CR. The operating-oil passage 55 is configured to guide the operating oil supplied from the valve body 51 and the linear solenoid valve 52 to the right clutch CR through the rotation input shaft 5. Although not illustrated, the operating oil supplied from the valve body 51 and the linear solenoid valve 52 is also guided to the left clutch CL through the rotation input shaft 5.

An oil strainer 57 is installed in the gear chamber 15. The oil strainer 57 has a suction port (not shown) for the operating oil in a bottom surface thereof, and the operating oil that is accumulated in the gear chamber 15 is sucked out through the suction port.

Figure 2:
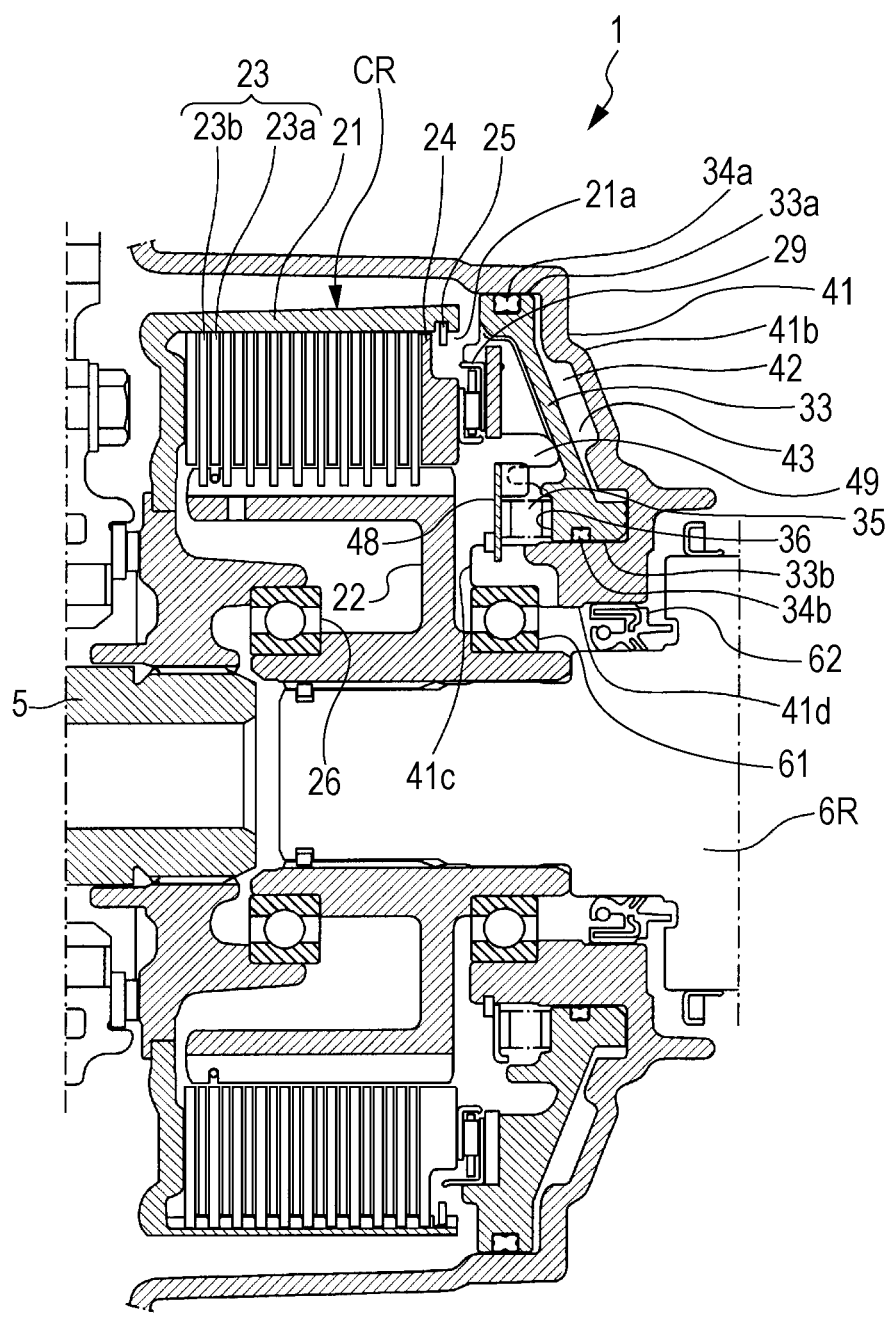
FIG. 2 is a side sectional view illustrating the detailed structure of a clutch (right clutch) and a region surrounding the clutch.
Figure 3:
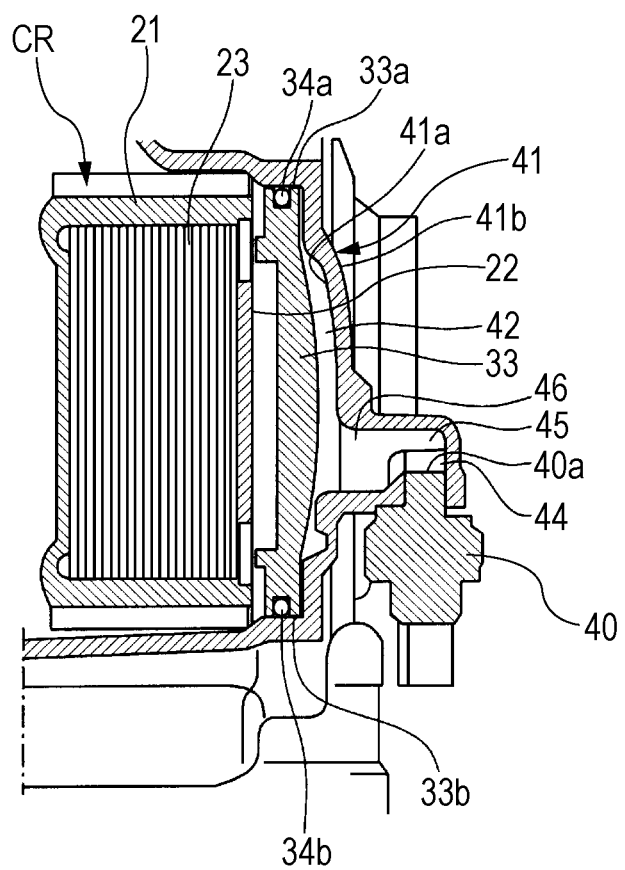
FIG. 3 illustrates an oil pressure sensor provided on the clutch.

FIG. 2 is a side sectional view illustrating the detailed structure of the clutch (right clutch) CR and a region surrounding the clutch CR. FIG. 3 illustrates an oil pressure sensor 40 provided on the right clutch CR. The clutch (right clutch) CR includes a substantially cylindrical clutch housing 21 coupled to an end portion of the rotation input shaft 5, a clutch hub 22 that is splined to an end portion of the right axle 6R in a region inside the clutch housing 21, pressure plates 23a, and friction plates 23b. The pressure plates 23a and the friction plates 23b are friction members, and are alternately stacked in the axial direction in the clutch housing 21. The outer peripheries of the pressure plates 23a are splined to the clutch housing 21, and the inner peripheries of the friction plates 23b are splined to the clutch hub 22. The pressure plates 23a and the friction plates 23b form a frictional engagement unit 23. An end plate 24 is provided at one end of the frictional engagement unit 23 in the direction in which the pressure plates 23a and the friction plates 23b are stacked (at the end adjacent to a cylinder piston 33, which will be described below). The clutch housing 21 has an opening 21a at one end thereof in the axial direction (at the end adjacent to the cylinder piston 33). A circlip 25 for preventing the end plate 24 from being detached is attached to the opening 21a. A clutch bearing 26, which supports the clutch housing 21 and the clutch hub 22 so that the clutch housing 21 and the clutch hub 22 are relatively rotatable, is provided between the clutch housing 21 and the clutch hub 22 in an inner peripheral region of the frictional engagement unit 23.

The cylinder piston (piston member) 33, which opposes the opening 21a, is disposed in a piston housing 41. The piston housing 41 has a substantially circular opening 41d in a central region thereof, and a cylindrical flange portion 41c that projects toward the clutch CR in the axial direction is formed around the opening 41d. An accommodating portion 43 that accommodates the cylinder piston 33 is formed around the flange portion 41c. The accommodating portion 43 is an annular recess that is recessed, in the axial direction, from a surface of the piston housing 41 that opposes the frictional engagement unit 23. The cylinder piston 33 is an annular plate-shaped member disposed in the accommodating portion 43. A thrust needle bearing 29 is interposed between the cylinder piston 33 and the end plate 24, so that the cylinder piston 33 and the end plate 24 are rotatable relative to each other and movable together in the axial direction.

A piston chamber (oil chamber) 42 in which an oil pressure of the operating oil is generated is defined between the inner surface of the accommodating portion 43 of the piston housing 41 and the cylinder piston 33. Although not illustrated, an oil passage through which the operating oil guided from the oil pump 54 (see FIG. 1) is introduced is connected to the piston chamber 42. As illustrated in FIG. 3, the oil pressure sensor 40 is provided to detect the oil pressure in the piston chamber 42. The oil pressure sensor 40 is arranged so that the axial direction (longitudinal direction) thereof extends along a back surface 41b of the piston housing 41. FIGS. 1 and 2 do not show the oil pressure sensor 40 since the oil pressure sensor 40 do not appear in the sectional views of FIGS. 1 and 2.

The cylinder piston 33 is installed so as to be movable in the axial direction in the accommodating portion 43 of the piston housing 41. An outer sealing member (O-ring) 34a is interposed between an outer periphery 33a of the cylinder piston 33 and the inner peripheral surface of the accommodating portion 43 of the piston housing 41, which opposes the outer periphery 33a of the cylinder piston 33, to seal the gap therebetween. An inner sealing member (O-ring) 34b is interposed between an inner periphery 33b of the cylinder piston 33 and the outer peripheral surface of the accommodating portion 43 of the piston housing 41, which opposes the inner periphery 33b of the cylinder piston 33, to seal the gap therebetween.

A return spring (urging member) 35 is provided to urge the cylinder piston 33 in a direction away from the frictional engagement unit 23 against the oil pressure in the piston chamber 42. One end (rear end) of the return spring 35 is in contact with a contact portion 36 provided on a surface of the inner periphery 33b of the cylinder piston 33 at a side opposite to the side adjacent to the piston chamber 42. The contact portion 36 is a substantially annular band-shaped portion that extends along the entire circumference of the inner periphery 33b of the cylinder piston 33. The other end (front end) of the return spring 35 is fixed (secured) to the piston housing 41 by a return spring guide 48. Thus, the contact portion 36 of the cylinder piston 33 is pressed (urged) in the direction away from the frictional engagement unit 23 along the axial direction by the urging force (resilient force) of the return spring 35.

Figure 4A:
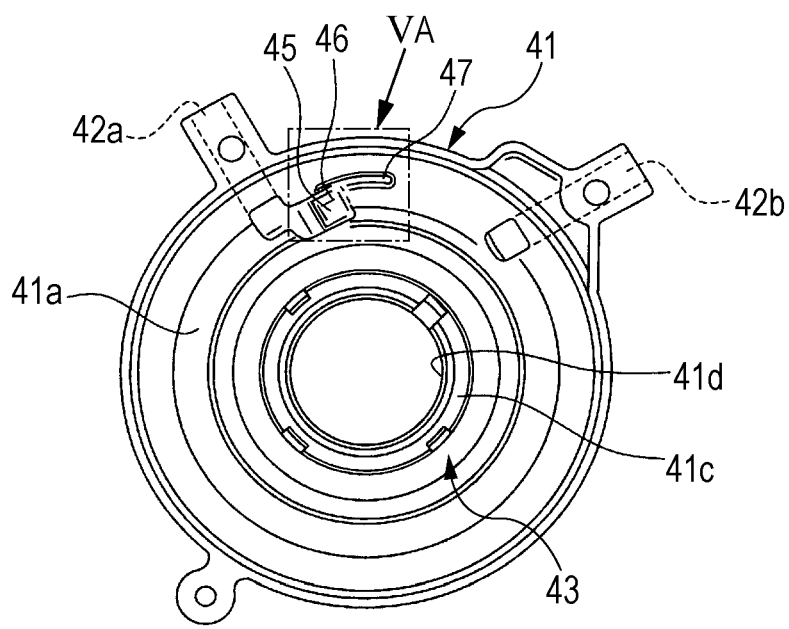
FIG. 4A is a perspective view of a piston housing viewed from the inside.
Figure 4B:
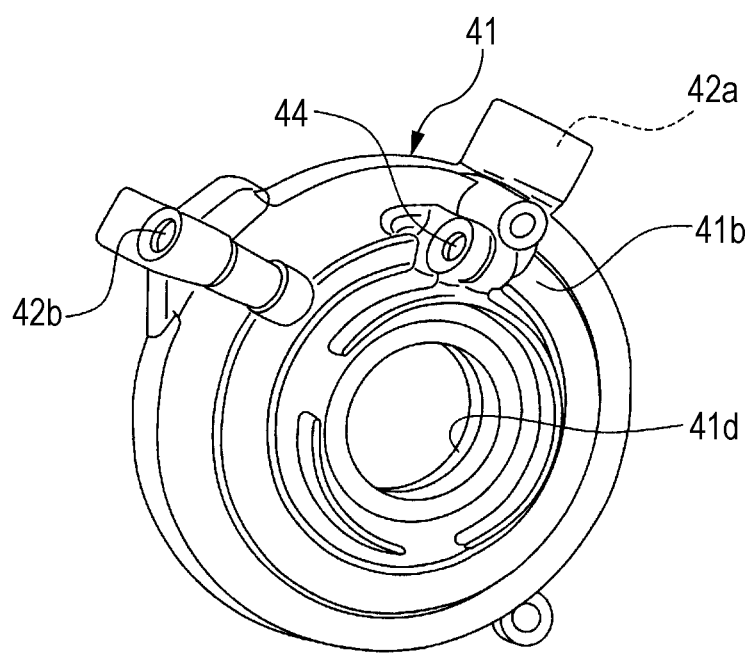
FIG. 4B is a perspective view of the piston housing viewed from the outside.
Figure 5A:
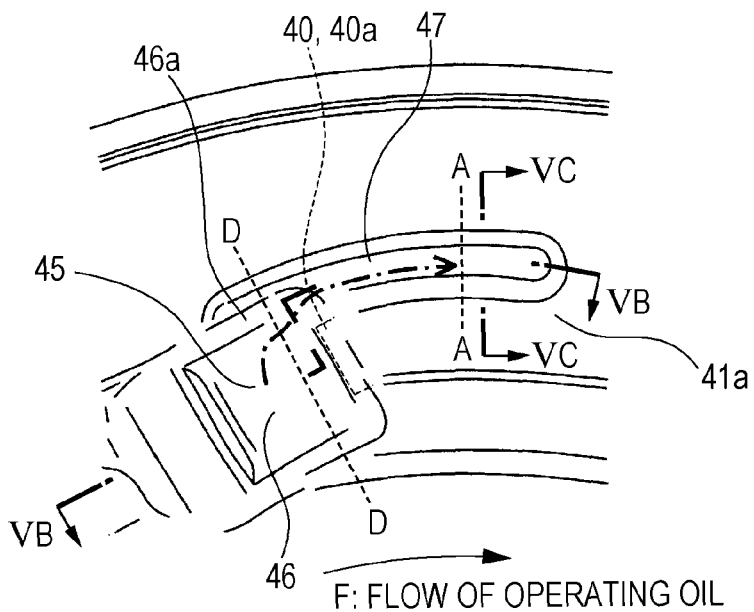
FIGS. 5A to 5C illustrate the detailed structures of a bubble removing chamber and a bubble discharging groove formed in an inner surface of the piston housing.
Figure 5B:
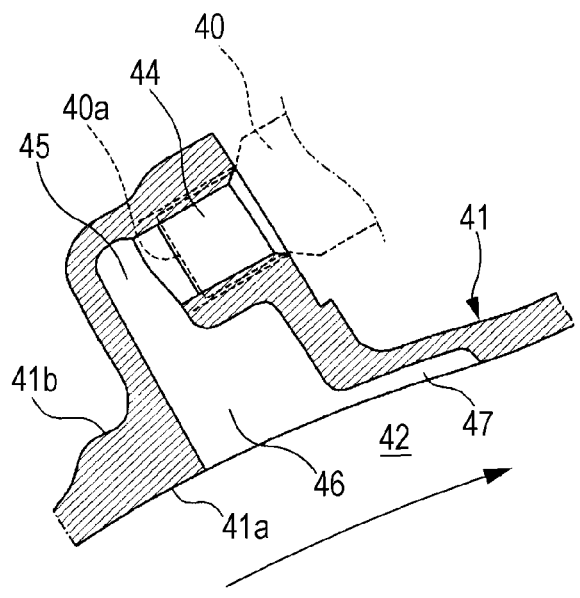
Figure 5C:
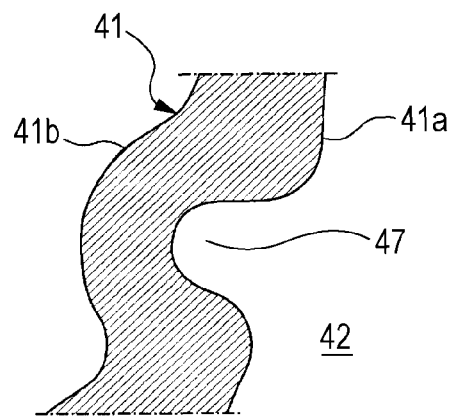

FIG. 4A is a perspective view of the piston housing 41 viewed from the inside, and FIG. 4B is a perspective view of the piston housing 41 viewed from the outside. FIGS. 5A to 5C illustrate the detailed structures of a bubble removing chamber 46 and a bubble discharging groove 47 formed in an inner surface 41a of the piston housing 41. FIG. 5A is an enlarged view of part VA in FIG. 4A, FIG. 5B is a sectional view of FIG. 5A taken along line VB-VB, and FIG. 5C is a sectional view of FIG. 5A taken along line VC-VC. As described above, the piston housing 41 has the circular opening 41d in the central region thereof, and the substantially cylindrical flange portion 41c is formed at the outer periphery of the opening 41d. An operating oil inlet 42a, through which the operating oil is introduced into the piston chamber 42, and an operating oil outlet 42b, through which the operating oil is discharged from the piston chamber 42, are provided between the inner surface 41a and the outer surface (back surface) 41b of the piston housing 41. Each of the operating oil inlet 42a and the operating oil outlet 42b extends radially inward from the outer periphery of the piston housing 41 and communicates with an opening formed in the inner surface 41a.

An attachment hole 44 to which the oil pressure sensor 40 is attached is formed in the back surface 41b of the piston housing 41. The attachment hole 44 opens in a tangential direction at the back-surface-41b side of the piston housing 41, and extends in the tangential direction. An operating-oil receiving chamber 45, in which a detection portion (tip portion) 40a of the oil pressure sensor 40 attached to the attachment hole 44 is disposed, is formed in the inner surface 41a of the piston housing 41. The bubble removing chamber 46, which is provided to remove bubbles accumulated in the operating-oil receiving chamber 45, is also formed in the inner surface 41a of the piston housing 41 at a position adjacent to the operating-oil receiving chamber 45 (more specifically, at a position adjacent to the piston-chamber-42 side of the operating-oil receiving chamber 45 in the axial direction of the rotation input shaft 5). In addition, the bubble discharging groove 47, which continues to the bubble removing chamber 46, is also formed in the inner surface 41a of the piston housing 41.

Referring to FIGS. 5A to 5C, the bubble removing chamber 46 is disposed adjacent to the operating-oil receiving chamber 45 at substantially the same height, and is arranged so that an upper portion 46a of the bubble removing chamber 46 is above the operating-oil receiving chamber 45. Thus, the bubble removing chamber 46 extends over a region including the detection portion 40a of the oil pressure sensor 40 and a region above the detection portion 40a. The bubble discharging groove 47 extends downstream in a direction of flow of the operating oil in the piston chamber 42 (direction of arrow F in FIG. 5A) from the upper portion 46a of the bubble removing chamber 46. In other words, the bubble discharging groove 47 is an arc-shaped groove that extends circumferentially in a direction of rotation of the frictional engagement unit 23 from the upper portion 46a of the bubble removing chamber 46. The cross section of the bubble discharging groove 47 (cross section along line A-A in FIG. 5A) is smaller than the cross section of the bubble removing chamber 46 (cross section along line D-D in FIG. 5A).

Thus, the oil pressure sensor 40 is arranged so that the axial direction (longitudinal direction) thereof extends along the back surface 41b of the piston housing 41, and the bubble removing chamber 46 and the bubble discharging groove 47 are formed in the inner surface 41a of the oil pressure sensor 40 in a region around the detection portion 40a of the oil pressure sensor 40. The bubble removing chamber 46 extends over a region including the detection portion 40a of the oil pressure sensor 40 and a region above the detection portion 40a, and the bubble discharging groove 47 extends downstream from the bubble removing chamber 46 in the direction in which the operating oil flows in the piston housing 41.

In the right clutch CR having the above-described structure, when the oil pump 54 is operated so as to introduce the operating oil into the piston chamber 42 of the piston housing 41, the cylinder piston 33 receives a pressure from the piston chamber 42 and moves toward the right clutch CR in the axial direction. Accordingly, the end plate 24 is pressed by the cylinder piston 33, and the pressure plates 23a and the friction plates 23b engage with each other, so that the right clutch CR is engaged. When the operating oil is discharged from the piston chamber 42, the cylinder piston 33 is moved away from the right clutch CR in the axial direction by the urging force applied by the return spring 35. Accordingly, the pressing force applied to the pressure plates 23a and the friction plates 23b is reduced and the right clutch CR is disengaged.

The operating oil sucked by the oil pump 54 is introduced into the piston chamber 42 through the operating oil inlet 42a of the piston housing 41 and discharged to the outside through the operating oil outlet 42b of the piston housing 41. The operating oil discharged through the operating oil outlet 42b is guided to the valve body 51 and the linear solenoid valve 52. The operating oil guided to the valve body 51 and the linear solenoid valve 52 is guided to the right clutch (frictional engagement unit) CR through the operating-oil passage 55, and is used for cooling and lubrication in the right clutch CR.

In the driving force transmitting apparatus 1 according to the present embodiment, the oil pressure sensor 40 is arranged so as to extend along the back surface 41b of the piston housing 41. Therefore, as illustrated in FIG. 5B, the detection portion 40a of the oil pressure sensor 40 is offset from the flow of the operating oil in the piston chamber 42. Therefore, the operating oil may be accumulated around the detection portion 40a of the oil pressure sensor 40, and bubbles in the operating oil may also be accumulated around the detection portion 40a as a result.

Since the flow of the operating oil in the piston chamber 42 is very weak, the bubbles around the detection portion 40a of the oil pressure sensor 40 are moved to the upper portion 46a (see FIG. 5A) of the bubble removing chamber 46 owing to the buoyant force. Since the bubble discharging groove 47 extends downstream from the upper portion 46a of the bubble removing chamber 46, the bubbles in the bubble removing chamber 46 can be guided to the bubble discharging groove 47 by the flow of the operating oil in the piston chamber 42. In addition, since the cross section of the bubble discharging groove 47 is smaller than that of the bubble removing chamber 46, the flow of the operating oil and the bubbles from the bubble removing chamber 46 to the bubble discharging groove 47 is affected by the change in the cross section so that the flow rate of the operating oil and the bubbles is increased. Thus, the bubbles accumulated on and around the detection portion 40a of the oil pressure sensor 40 receive a force that guides the bubbles toward the downstream side of the bubble discharging groove 47, and the bubbles can be effectively discharged from the bubble removing chamber 46. As a result, the accuracy of detection of the oil pressure in the piston chamber 42 by the oil pressure sensor 40, which has a simple structure, can be effectively increased.

More specifically, since a space (a portion of the bubble removing chamber 46) is provided at a position above the operating-oil receiving chamber 45 in which the detection portion 40a of the oil pressure sensor 40 is disposed, the bubbles in the operating-oil receiving chamber 45 are moved to the bubble removing chamber 46 owing to the buoyant force. In addition, since the cross section of the bubble discharging groove 47 is set so as to be smaller than that of the bubble removing chamber 46, the flow rate of the operating oil that flows from the bubble removing chamber 46 to the bubble discharging groove 47 increases. Thus, the bubbles that have been moved from the operating-oil receiving chamber 45 to the upper portion 46a of the bubble removing chamber 46 is forcibly discharged through the bubble discharging groove 47 disposed downstream of the upper portion 46a.

As described above, in the driving force transmitting apparatus 1 according to the present embodiment, the oil pressure sensor 40 is attached to the attachment hole 44 that extends along the back surface 41b of the piston housing 41, so that the oil pressure sensor 40 is arranged so as to extend along the back surface 41b of the piston housing 41. Accordingly, the freedom of arrangement of the oil pressure sensor 40 can be increased. In addition, the bubble removing chamber 46 is provided so as to extend to a region above the detection portion 40a of the oil pressure sensor 40, and the bubble discharging groove 47 is disposed downstream of the bubble removing chamber 46. Since the bubbles accumulated in the operating-oil receiving chamber 45 are removed due to the bubble removing chamber 46 and discharged through the bubble discharging groove 47, accumulation of the bubbles around the detection portion 40a of the oil pressure sensor 40 can be effectively prevented.

Figure 6A:
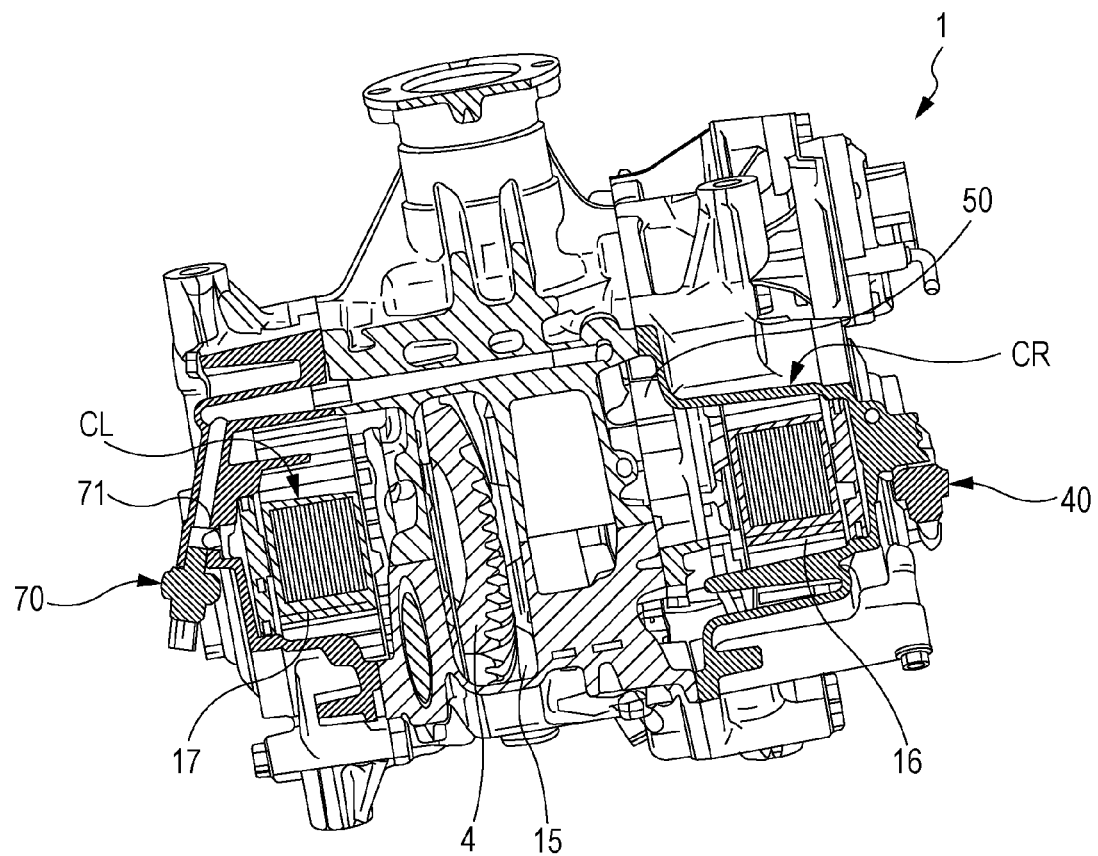
FIGS. 6A and 6B illustrate the arrangement of an oil pressure sensor provided on a left clutch and the oil pressure sensor provided on the right clutch, where
Figure 6B:
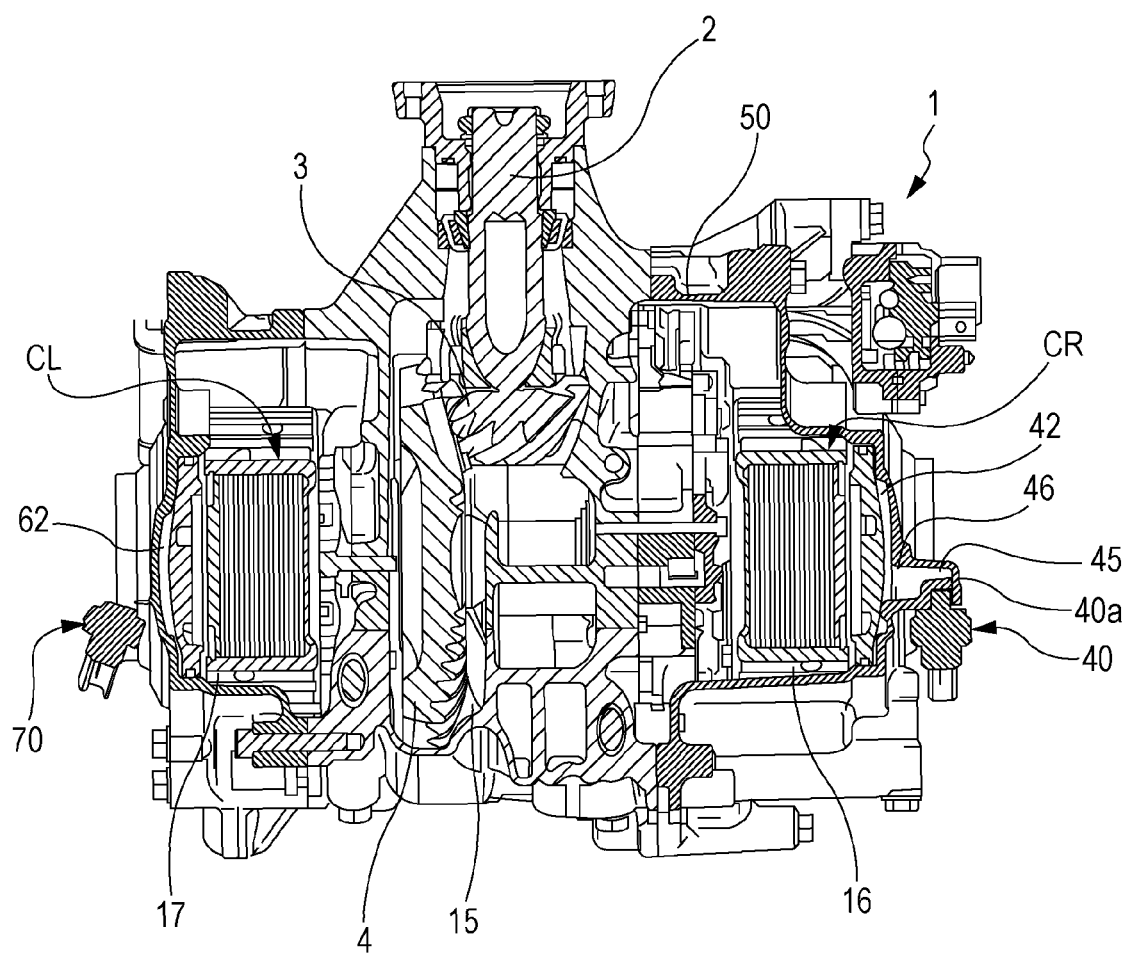

FIGS. 6A and 6B illustrate the arrangement of the oil pressure sensor 40 provided on the right clutch CR and an oil pressure sensor 70 provided on the left clutch CL. FIG. 6A is a sectional view of the driving force transmitting apparatus 1 including the oil pressure sensor 70 provided on the left clutch CL, and FIG. 6B is a sectional view of the driving force transmitting apparatus 1 including the oil pressure sensor 40 provided on the right clutch CR. In the driving force transmitting apparatus 1 according to the present embodiment, the right clutch CR is provided with the oil pressure sensor 40 for detecting the oil pressure in the piston chamber 42 of the right clutch CR, and the left clutch CL is provided with the oil pressure sensor 70 for detecting the oil pressure in a piston chamber 62 of the left clutch CL. As illustrated in FIG. 6A, the oil pressure sensor 70 provided on the left clutch CL is arranged as in the configuration according to the related art so that the axial direction of the oil pressure sensor 70 is substantially perpendicular to the direction in which an oil passage 71 extends from the piston chamber 62. As illustrated in FIG. 6B, the oil pressure sensor 40 provided on the right clutch CR is arranged as in the present embodiment so that the axial direction of the oil pressure sensor 40 extends along the back surface 41b of the piston housing 41. The reason for this is because, in the driving force transmitting apparatus 1 according to the present embodiment, the size of the system can be further reduced when the oil pressure sensor 70 for the left clutch CL is arranged so that the axial direction thereof crosses the oil passage 71 that extends from the piston chamber 62 and when the oil pressure sensor 40 for the right clutch CR is arranged so that the axial direction thereof extends along the back surface 41b of the piston housing 41. Thus, the arrangement of the oil pressure sensor 40 according to the present embodiment is preferably applied as appropriate as long as it contributes to the reduction in size of the system.

Although an embodiment of the present disclosure has been described, the present disclosure is not limited to the above-described embodiment, and various modifications are possible within the technical concept described in the claims, specification, and drawings. For example, the arrangement of the oil pressure sensor according to the present disclosure may be applied not only to a driving force transmitting apparatus including clutches for transmitting the driving force to left and right wheels of a vehicle in a distributed manner as in the above-described embodiment, but also to a driving force transmitting apparatus having another structure (for example, a part of a transmission including a transmission clutch or a brake) as long as the driving force transmitting apparatus includes a piston member for driving a frictional engagement unit, such as a clutch or a brake, and a piston chamber. In addition, the structure of the frictional engagement unit according to the present disclosure is not limited to a clutch in which the frictional engagement unit is disposed between two coaxially arranged rotating shafts as in the above-described embodiment, and may instead be, for example, a brake in which the frictional engagement unit is disposed between a rotating shaft or member and a fixed member, such as a casing.

A driving force transmitting apparatus according to an aspect of the present disclosure includes a rotating shaft (51, 52); a frictional engagement device (20) including a frictional engagement unit (23) that is disposed around the rotating shaft (51, 52) and which includes first and second friction members (23a, 23b) that are alternately stacked in an axial direction; a piston member (33) that is movable in the axial direction and that presses the frictional engagement unit (23) so that the first and second friction members (23a, 23b) are engaged with each other; a piston housing (41) that contains the piston member (33); a piston chamber (42) that is defined between an inner surface (41a) of the piston housing (41) and the piston member (33) and in which an oil pressure for moving the piston member (33) toward the frictional engagement unit (23) is generated; an oil pressure sensor (40) for detecting the oil pressure of operating oil in the piston chamber (42); an attachment hole (44) that opens in a back surface (41b) of the piston housing (41) and to which the oil pressure sensor (40) is attached such that an axial direction of the oil pressure sensor (40) extends along the back surface (41b) of the piston housing (41); an operating-oil receiving chamber (45) that is provided in the inner surface (41a) of the piston housing (41) and in which a detection portion (40a) of the oil pressure sensor (40) attached to the attachment hole (44) is disposed; a bubble removing chamber (46) for removing bubbles accumulated in the operating-oil receiving chamber (45), the bubble removing chamber (46) being provided in the inner surface (41a) of the piston housing (41) at a position adjacent to the operating-oil receiving chamber (45); and a bubble discharging groove (47) that continues to the bubble removing chamber (46). The bubbles accumulated in the operating-oil receiving chamber (45) are removed due to the bubble removing chamber (46) and discharged to the bubble discharging groove (47) from the bubble removing chamber (46).

In the driving force transmitting apparatus according to the aspect of the present disclosure, the oil pressure sensor is arranged so as to extend along the back surface of the piston housing, so that the freedom of arrangement of the oil pressure sensor can be increased. In addition, the operating-oil receiving chamber in which the detection portion of the oil pressure sensor attached to the attachment hole is disposed, the bubble removing chamber for removing the bubbles accumulated in the operating-oil receiving chamber, and the bubble discharging groove that continues to the bubble removing chamber are provided in the inner surface of the piston housing. Therefore, even when the bubbles are accumulated in the operating-oil receiving chamber in which the detection portion of the oil pressure sensor is disposed, the bubbles are removed due to the bubble removing chamber and discharged through the bubble discharging groove, so that accumulation of the bubbles on and around the detection portion of the oil pressure sensor can be effectively prevented. Thus, the freedom of arrangement of the oil pressure sensor for detecting the oil pressure in the piston chamber can be increased with a simple structure, the size of the system can be reduced, and accumulation of the bubbles can be prevented so that the oil pressure in the piston chamber can be accurately detected with the oil pressure sensor.

In this case, at least a portion of the bubble removing chamber (46) may be located above the operating-oil receiving chamber (45), and the bubble discharging groove (47) may extend downstream from an upper portion (46a) of the bubble removing chamber (46) in a direction of flow of the operating oil in the piston chamber (42). For example, the bubble discharging groove (47) may be arc-shaped and extend circumferentially in a direction of rotation of the frictional engagement unit (23) from the upper portion (46a) of the bubble removing chamber (46).

Since the flow of the operating oil generated in the piston chamber is very weak, the bubbles accumulated on and around the detection portion of the oil pressure sensor are moved to the upper portion of the bubble removing chamber from the operating-oil receiving chamber owing to the buoyant force. Since the bubble discharging groove extends downstream from the upper portion of the bubble removing chamber, the bubbles in the bubble removing chamber can be guided to the bubble discharging groove by the flow of the operating oil in the piston chamber. When the cross section of the bubble discharging groove is smaller than that of the bubble removing chamber, the flow of the operating oil and the bubbles from the bubble removing chamber to the bubble discharging groove is affected by the change in the cross section so that the flow rate of the operating oil and the bubbles is increased. Thus, the bubbles accumulated on and around the detection portion of the oil pressure sensor receive a force that guides the bubbles toward the downstream side of the bubble discharging groove, and the bubbles accumulated on and around the detection portion of the oil pressure sensor can be effectively discharged. As a result, the accuracy of detection of the oil pressure in the piston chamber by the oil pressure sensor, which has a simple structure, can be effectively increased.

In the above description, the reference numerals in parentheses are those of the corresponding components in an embodiment of the present disclosure described below.

With the driving force transmitting apparatus according to the aspect of the present disclosure, the freedom of arrangement of the oil pressure sensor can be increased with a simple structure, the size of the system can be reduced, and the oil pressure in the piston chamber can be accurately detected with the oil pressure sensor.

Obviously, numerous modifications and variations of the present invention are possible in light of the above teachings. It is therefore to be understood that within the scope of the appended claims, the invention may be practiced otherwise than as specifically described herein.

What is claimed is:

1. A driving force transmitting apparatus comprising:
    a rotating shaft having an axial direction and being rotatable around the axial direction;
    a frictional engagement device including a frictional engagement unit which is disposed around the rotating shaft and which includes first and second friction members that are alternately stacked in the axial direction;
    a piston member that is movable in the axial direction to press the frictional engagement unit so that the first and second friction members are engaged with each other;
    a piston housing that contains the piston member;
    a piston chamber which is defined between an inner surface of the piston housing and the piston member and in which an oil pressure to move the piston member toward the frictional engagement unit is generated;
    an oil pressure sensor configured to detect the oil pressure of operating oil in the piston chamber;
    an attachment hole which opens in a back surface of the piston housing and to which the oil pressure sensor is attached such that a sensor axial direction of the oil pressure sensor extends along the back surface of the piston housing;
    an operating-oil receiving chamber which is provided in the piston housing and in which a detection portion of the oil pressure sensor is disposed;
    a bubble removing chamber to remove bubbles accumulated in the operating-oil receiving chamber, the bubble removing chamber being provided in the piston housing at a position adjacent to the operating-oil receiving chamber; and
    a bubble discharging groove which is connected to the bubble removing chamber and via which the bubbles are discharged.

2. The driving force transmitting apparatus according to claim 1, wherein a cross section of the bubble discharging groove is smaller than a cross section of the bubble removing chamber.

3. The driving force transmitting apparatus according to claim 1, wherein the attachment hole opens in a tangential direction of the piston housing at the back surface of the piston housing, and extends in the tangential direction.

4. The driving force transmitting apparatus according to claim 1, wherein the bubble removing chamber is provided in the piston housing at a position adjacent to a piston chamber side of the operating-oil receiving chamber in the axial direction.

5. The driving force transmitting apparatus according to claim 1, wherein at least a portion of the bubble removing chamber is located above the operating-oil receiving chamber, and
    wherein the bubble discharging groove extends downstream from an upper portion of the bubble removing chamber in a direction of flow of the operating oil in the piston chamber.

6. The driving force transmitting apparatus according to claim 2, wherein the bubble discharging groove is an arc-shaped groove that extends circumferentially in a direction of rotation of the frictional engagement unit from the upper portion of the bubble removing chamber.

* * * * *